(12) United States Patent
Wood, Jr.

(10) Patent No.: US 7,339,982 B2
(45) Date of Patent: Mar. 4, 2008

(54) MODULAR, JITTER-TOLERANT DATA ACQUISITION AND PROCESSING SYSTEMS

(75) Inventor: Reed Glenn Wood, Jr., Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 742 days.

(21) Appl. No.: 10/437,320

(22) Filed: May 13, 2003

(65) Prior Publication Data

US 2004/0228396 A1   Nov. 18, 2004

(51) Int. Cl.
*H04B 1/38* (2006.01)
*H04B 17/00* (2006.01)

(52) U.S. Cl. .................... 375/220; 375/224

(58) Field of Classification Search ............. 375/220, 375/224, 226, 218, 316; 714/752; 341/100, 341/101
See application file for complete search history.

(56) References Cited

U.S. PATENT DOCUMENTS

2003/0055998 A1* 3/2003 Saha et al. ................. 709/233
2003/0134607 A1* 7/2003 Raghavan et al. .......... 455/132
2003/0179783 A1* 9/2003 Uekama et al. ............ 370/535

\* cited by examiner

*Primary Examiner*—Khai Tran

(57) ABSTRACT

Modular, jitter-tolerant, data acquisition and processing systems are disclosed. An exemplary embodiment comprises a receiving portion having a first module configured to receive a serial bit stream and recover a serial data stream and a first clocking signal from the serial bit stream. The receiving portion also comprises a second module configured to receive the serial data stream and the first clocking signal and generate a parallel data stream and a second clocking signal.

25 Claims, 6 Drawing Sheets

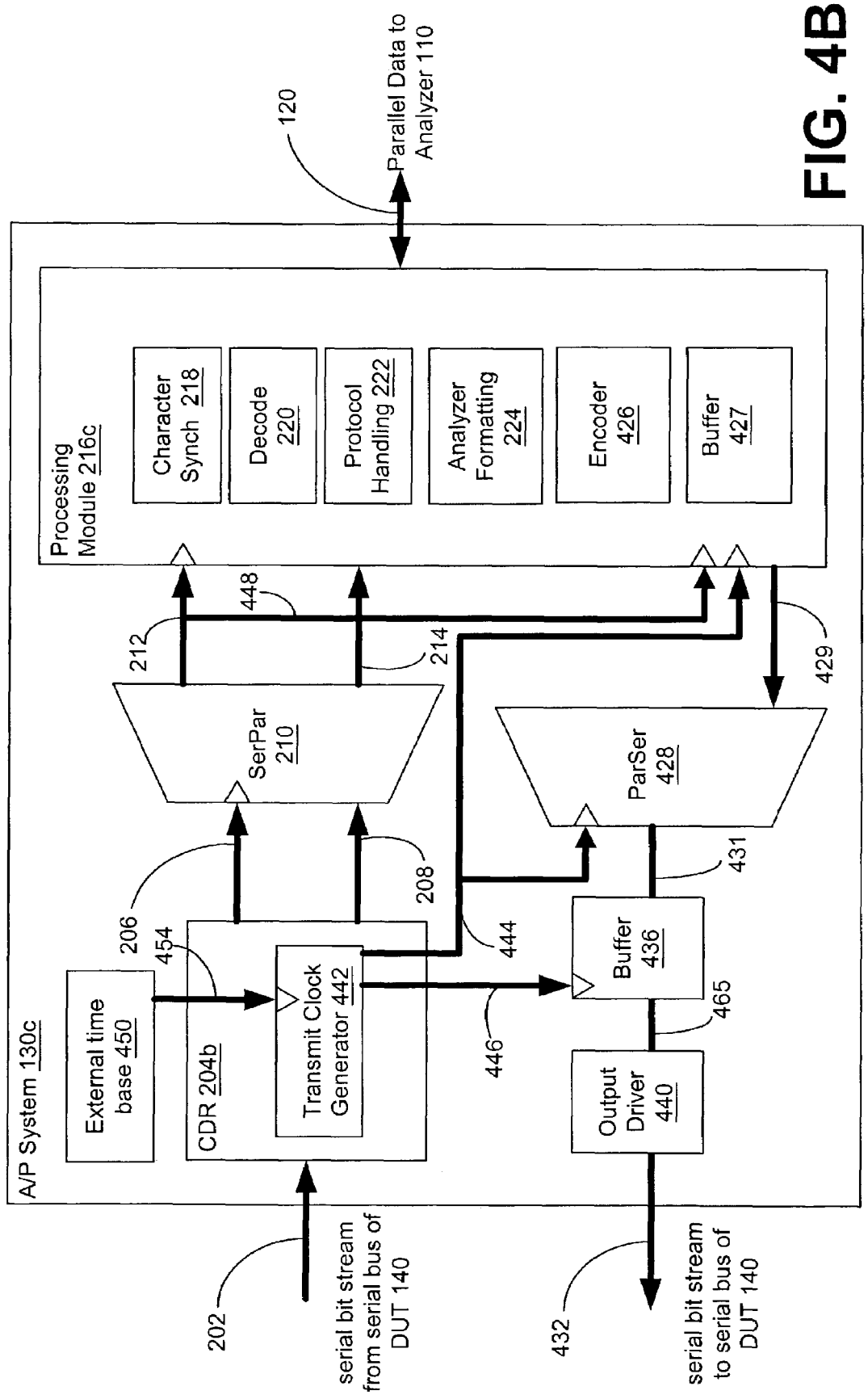

MODULAR, JITTER-TOLERANT DATA ACQUISITION AND PROCESSING SYSTEMS

BACKGROUND

High-speed digital transmission systems and high-speed digital input/output (I/O) busses are often required to receive or regenerate data using a clocking signal that is recovered or extracted from the serial bit stream. Variation in the data rate, commonly known as jitter, can complicate the data recovery and data regeneration process. Various devices have been used to address jitter in these applications.

A typical serializer/deserializer (SerDes) device receives a serial bit stream on its serial input. The serial bit stream includes a serial data stream and a clocking signal. The SerDes device extracts the clocking signal that is embedded in the serial bit stream (a process also known as bit synchronization), deserializes the serial bit stream, and defines a character boundary in the resulting parallel bit stream (a process also know as character synchronization, framing, aligning, etc.).

The above-described process is reversed on the transmit side. For example, on the transmit side, the SerDes device receives a parallel bit stream, generates a serial transmit clock, time multiplexes the parallel bits into a serial bit stream, and drives the serial bit stream out of the serial outputs.

SerDes devices are configured as a commodity monolithic integrated circuit (IC), and there are a variety of them that support different bit rates (for bit synchronization) and protocols (for character synchronization).

One type of monolithic IC implements the serial advanced technology attachment (SATA) bus specification. The SATA specification is challenging in that it provides for the transmission of coded data with an embedded clock that also has spread spectrum modulation on it. Spread spectrum clocking (SSC) for such applications is difficult for any phase-locked-loop (PLL)-based clock recovery circuit to track, especially PLL-based circuitry found in the current population of commodity monolithic SerDes devices.

Another type of monolithic IC used for these high-speed applications, especially in the telecom industry, is a Clock and Data Recovery (CDR) circuit (or device). CDR devices are available to support a variety of bit rates and jitter tolerances. The telecom industry uses large networks spanning long distances. Multiple repeaters are often used, each of which comprise one or more CDRs to meet stringent jitter specifications aimed at preventing excessive jitter buildup throughout the network. For instance, Synchronous Optical Network/Synchronous Digital Hierarchy (SONET/SDH) has detailed specifications that a repeater must meet in terms of jitter tolerance, jitter transfer, and jitter generation. In order to meet these specifications, a SONET-compliant repeater usually uses a CDR.

A CDR includes the ability to output the clocking signal and re-timed data from its bit synchronization. Often, CDRs are employed in repeaters simply to control jitter accumulation across the network. These CDRs usually provide high jitter tolerance, transfer jitter frequencies only up to a cutoff frequency with little peaking (<0.1 decibel (dB)), and introduce very little jitter on their own. Also, CDR functionality is often employed in SerDes devices to provide a defined tolerance to jitter. However, this intrinsic CDR functionality for a SerDes device typically does not receive 100% of the design focus, and thus the resulting tolerance to jitter is often susceptible to design trade-offs. Further, switching often occurs in the same SerDes monolithic device that includes this intrinsic CDR functionality, often consuming some of the design jitter tolerance.

Thus, although jitter is often addressed to some degree by monolithic devices, they offer limited flexibility in design and/or operation of systems handling serial data. Thus, a need exists in the industry to address the aforementioned and/or other deficiencies and/or inadequacies.

SUMMARY

Embodiments of modular, jitter-tolerant, data acquisition and processing systems are provided. An exemplary embodiment includes a receiving portion having a first module configured to receive a serial bit stream and recover a serial data stream and a first clocking signal from the serial bit stream. The receiving portion also includes a second module configured to receive the serial data stream and the first clocking signal and generate a parallel data stream and a second clocking signal.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects can be better understood with reference to the following drawings. The components in the drawings are not necessarily to scale. Moreover, in the drawings, like reference numerals designate corresponding parts throughout the several views.

FIG. 4B is a block diagram of another embodiment of an A/P system using a different methodology for generating clocking signals used in transmission.

DETAILED DESCRIPTION

Although described with particular reference to an analyzer probe used in a serial data analyzer system, embodiments of the modular, jitter-tolerant data acquisition and processing systems (herein, referred to as acquisition and processing (A/P) systems) can be implemented in many system that recovers data streams and clocking signals from bit streams. The description that follows will provide a general overview of a serial data analyzer system, and then several embodiments of A/P systems as used in a probe of the serial data analyzer system (herein analyzer system) are described.

Figure 1:
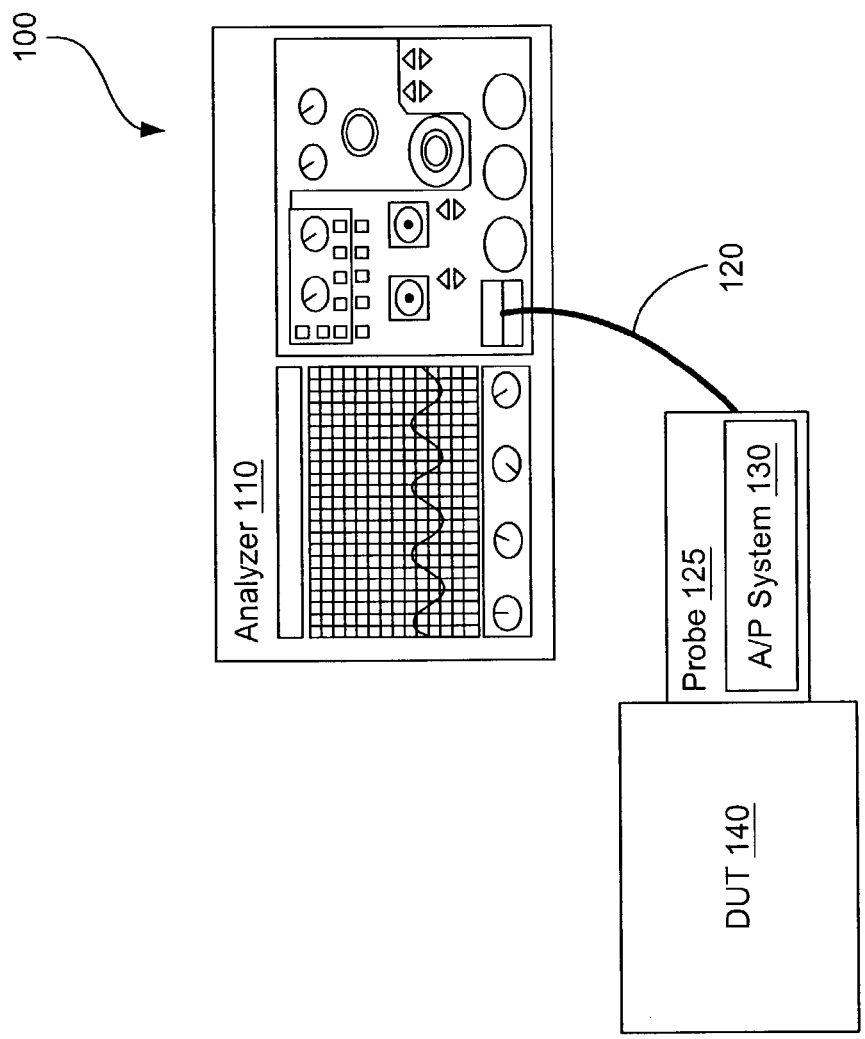
FIG. 1 is a block diagram illustrating an example implementation for an acquisition and processing (A/P) system.

FIG. 1 is a block diagram illustrating an exemplar implementation for several embodiments of A/P systems. The analyzer system 100 includes an analyzer 110, and a probe 125 connected to the analyzer 110 over connection 120. The probe 125 enables communication (one-way or two way) between the analyzer 110 and a device under test (DUT 140) (e.g., a device to be analyzed). The DUT 140 can include network equipment, circuit boards, etc. The probe 125 can be used to acquire and process data for evaluation of various serial data protocols, such as Firewire, fiber channel, etc.

The probe 125 also includes an acquisition and processing (A/P) system 130, which can receive a serial bit stream acquired from a bus or other bit stream path of the DUT 140. The A/P system 130 also recovers serial data and a clocking signal from the serial bit stream, and generates a parallel data stream and a parallel clocking signal as described below.

Figure 2:
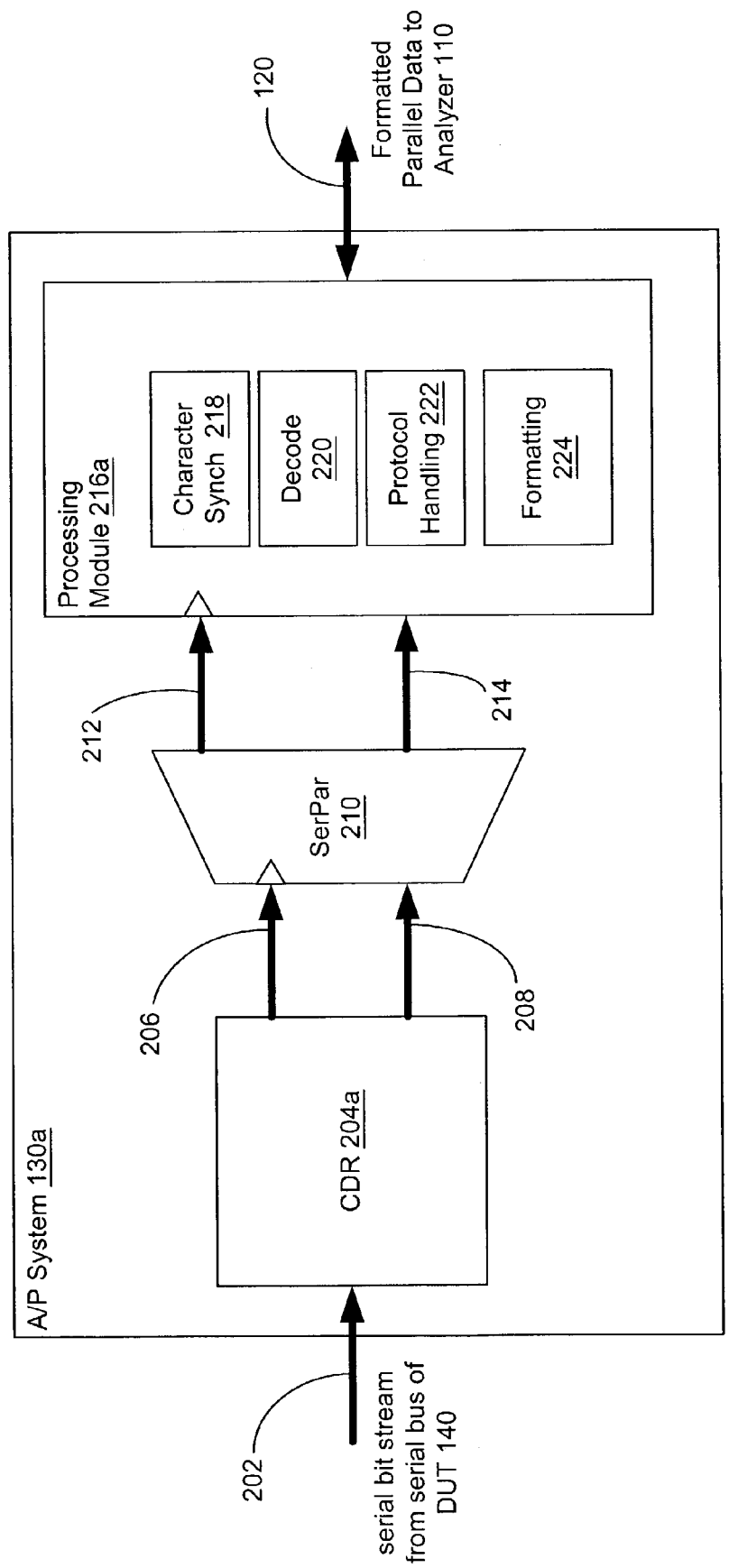
FIG. 2 is a block diagram of the embodiment of the A/P system shown in FIG. 1 for recovering and generating data streams and clocking signals from a received bit stream.

FIG. 2 is a block diagram of an embodiment of the A/P system 130 used in the probe 125 of FIG. 1, referred to as A/P system 130a (the lower case "A" representing an embodiment of the A/P system 130 of FIG. 1). The A/P system 130a recovers and generates data streams and clocking signals from received bit streams. The A/P system 130a includes several physically distinct modules (e.g., physically distinct monolithic devices or components), including a clock and data recovery (CDR) module 204a, a serial-to-parallel (SerPar) module 210, and a processing module 216a.

In operation, the CDR module 204a receives a serial bit stream over connection 202. The serial bit stream can be carried over a serial bus, for example, located in the DUT 140 (FIG. 1), and coupled to the CDR module 204a via a serial port connection (not shown) connected to the probe 125 (FIG. 1). The CDR module 204a can include any well-known clock and data recovery devices, such as the commercially available Micrel SY87721, and can be based on a phase-locked-loop architecture (PLL) or other clock and data recovery architectures.

The CDR module 204a can be selected to support a wide variety of bit rates or data codings (e.g., where the serial bit stream is scrambled or encoded), and/or a very high, low-frequency jitter tolerance. Such features enable the CDR module 204a to track a spread spectrum clocking (SSC) signal found, for example, in devices under test conforming to such data interface standards as serial advanced technology attachment (SATA).

Monolithic SerDes devices based on PLL technology often are not suited to SSC used in SATA compliant systems. With spread spectrum clocking, an instantaneous frequency of the clocking signal (embedded in the serial bit stream) is modulated. If over-modulated (e.g., if the clocking signal is frequency modulated using sine wave modulation, over-modulation includes generating a sine wave having an amplitude that is too large and/or using a frequency that is too high), the PLL can lose "lock," causing errors in recovery of the clocking signal. The CDR module 204a recovers the serial data stream and a serial clocking signal, which are embedded in the serial bit stream on connection 202. Thus, the CDR module 204a maintains bit synchronization, even in the presence of SSC signals.

The serial clocking signal is provided over connection 206 to the SerPar module 210. A small triangle symbol is shown in the SerPar module 210, among other modules, to represent functionality for receiving a clocking signal. Also, the serial data stream is provided over connection 208 to the SerPar module 210. The SerPar module 210 converts the serial data stream on connection 208 to a parallel data stream having, for example, an 8-bit (or one byte) width in a 1:8 conversion. The SerPar module 210 provides this parallel data stream over connection 214 to the processing module 216a. The SerPar module 210 also provides a parallel clocking signal (e.g., one byte) over connection 212 to the processing module 216a. The SerPar module 210 can be implemented using any well-known serial-to-parallel device, such as On Semiconductor 10EP445, among others.

The processing module 216a includes several sub-modules, implemented in hardware and/or software, including character synchronization sub-module 218, decode sub-module 220, protocol handling sub-module 222, and formatting sub-module 224. The character synchronization sub-module 218 defines character boundaries of the received parallel data stream (a process known in the art as character synchronization). In other words, the character synchronization sub-module 218 generates a parallel data stream with serial bits in the correct parallel position. For example, in an 8-to-10 bit encoding methodology typically used for SATA implementations, the character synchronization sub-module 218 can demultiplex the received parallel data stream by 5 to generate 40 bits. The 40 bits (which is the Least Common Multiple (LCM) of "8" and "10") can then be divided down into 4-character words of 10 bits each. Note that in other implementations, a serial-to-parallel module can perform the demultiplexing.

The resulting character-synchronized, parallel data stream is provided to the decode sub-module 220, which decodes the character-synchronized, parallel data stream (e.g., 10 bit to 8 bit decoding). The resultant 8-bit parallel data stream is provided to the protocol handling sub-module 222.

The protocol handling sub-module 222 interrogates the character words decoded by the decode sub-module 220 to determine frame boundaries, in addition to performing other well-known operations such as descrambling payload data. The protocol handling sub-module 222 provides a signal, which includes the information determined in the protocol handling sub-module 222 (e.g., primitives and frame information depending on the defined protocol), to the formatting sub-module 224, which formats the signal and sends the formatted signal over connection 120 to the analyzer 110 (FIG. 1).

The processing module 216a can be implemented in an application specific integrated circuit (ASIC) or a field programmable gate array (FPGA), such as the commercially available XILINK Virtex, among others.

The modularity of the A/P system 130a provides for the recovery of serial clocking signals and re-timed data outputs that are readily accessible to test equipment, such as an oscilloscope for eye diagram measurements, to spectrum analyzers to measure the SSC signal, and to other devices for testing bit error rates. Related to this feature is the ability to debug the A/P system 130a in a more facilitated manner than monolithic SerDes devices, due at least in part to the availability of more test access ports.

Further, the modularity of the A/P system 130a also "frees" the processing module 216a from being subject to any idiosyncrasies of a chosen monolithic device into which it is integrated, such as a SerDes, due in part to the isolation between modules of the A/P system 130a. Similarly, a modular CDR 204a is substantially isolated from the switching activity of the other modules, providing for more dedicated jitter tolerance compared to monolithic SerDes devices. In addition, the modularity also enables the provision of supplemental information. For example, detailed character synchronization information (e.g., bit/byte slips, reframes, etc.) can be provided by the processing module

216a. In contrast, monolithic SerDes devices are typically only required to meet protocol specifications for which the SerDes devices were designed. Errors and/or conditions can arise in testing implementations, such as in logic analysis, that are not anticipated by a particular protocol specification. A modular A/P system can facilitate the provision of diagnostic data by an analyzer in such environments.

In addition, time-to-market can be reduced using the A/P system 130a versus a single monolithic IC such as a SerDes, which is typically developed to meet a particular standard. In contrast, the modular components of the A/P system 130a can support many different standards. For example, commercially available serial-to-parallel devices can deserialize almost any kind of data stream as long as a serial clocking signal is available and the data rates are within the operating specifications of the serial-to-parallel device. Further, clock and data recovery devices can function with almost any kind of non-return to zero (NRZ), scrambled, or encoded bit stream as long as the frequency of the bit stream is within the operating limits of the clock and data recovery device. In addition, there exists a large population of multi-rate and continuous rate clock and data recovery devices that cover most rates approximately between 100 mega bits per second (Mbps) to 3.125 giga bits per second (Gbps).

The modularity of the A/P system 130a also lends itself to less expensive and/or easier re-work due to the functionality of the A/P system 130a being distributed across multiple components or devices.

Figure 3A:
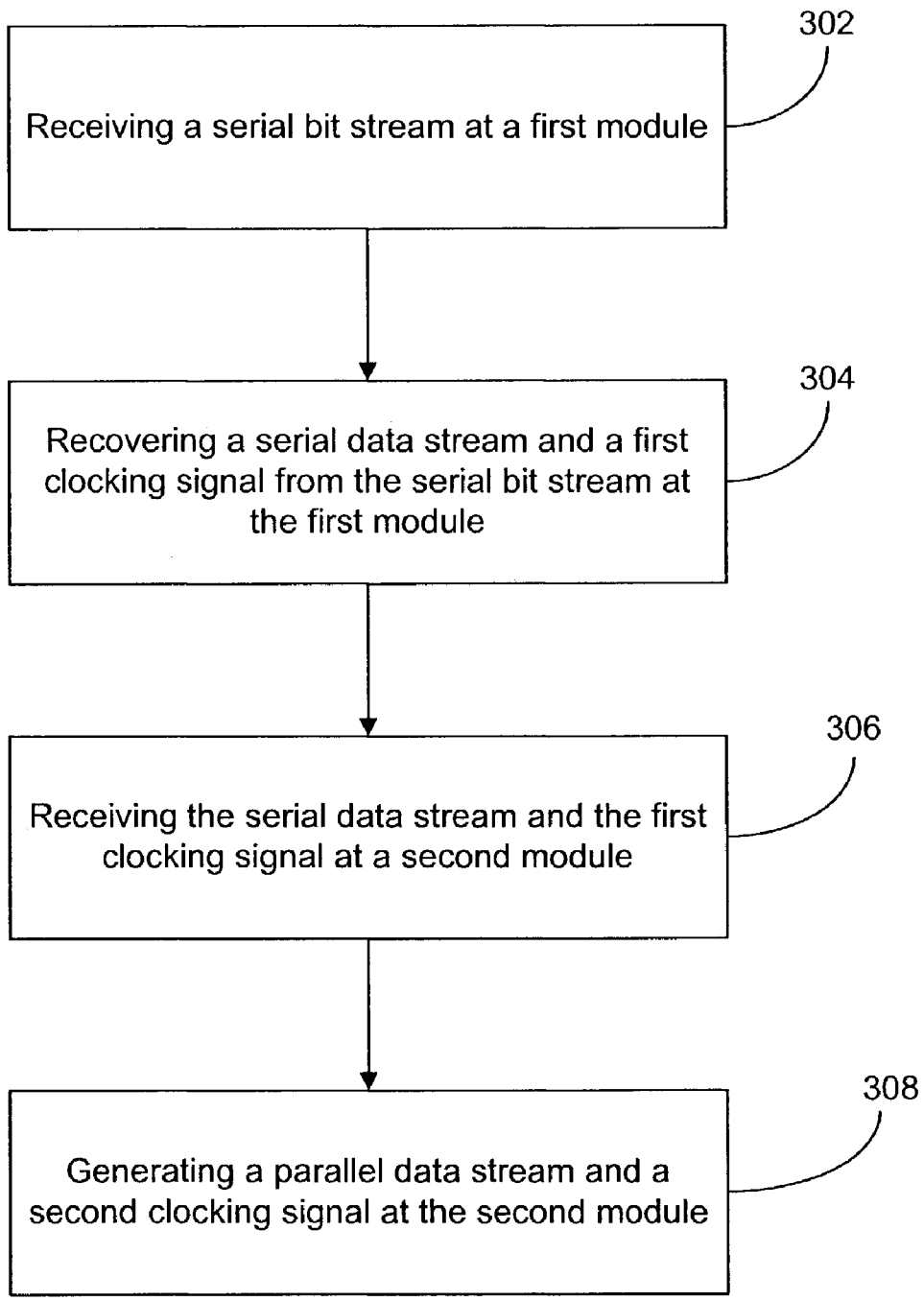
FIG. 3A is a flow chart illustrating the method of the A/P system of FIG. 2 for recovering and generating data streams and clocking signals from the received bit stream.
Figure 3B:
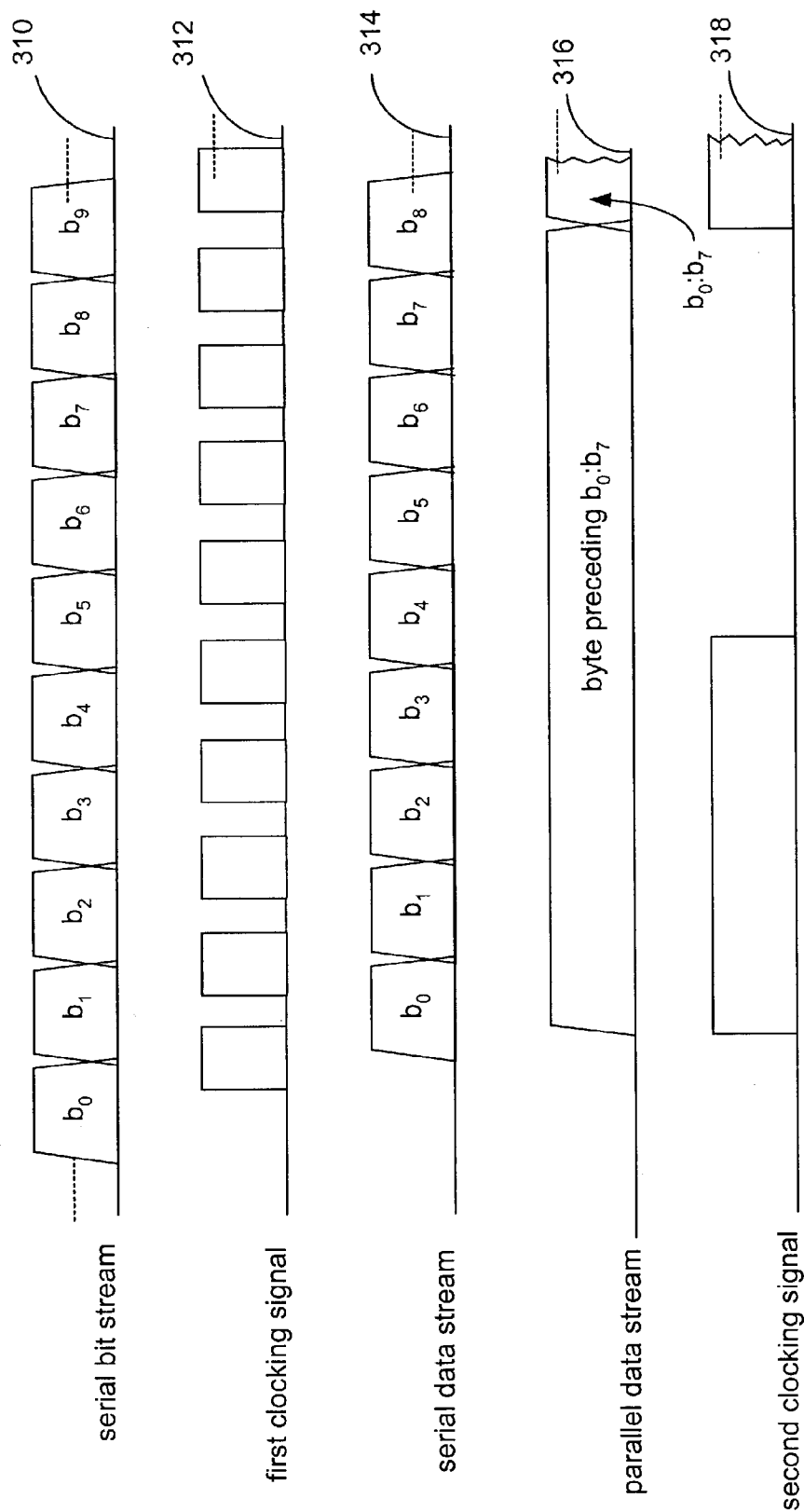
FIG. 3B is a simplified timing diagram illustrating the recovery and generation of data streams and clocking signals in the A/P system of FIG. 2.

FIG. 3A is a flow chart illustrating a method for recovering and generating data streams and clocking signals from the received bit stream in the A/P system 130a of FIG. 2. FIG. 3B is a timing diagram illustrating the recovery and generation of data streams and clocking signals in the A/P system 130a of FIG. 2. With continued reference to FIG. 2, FIGS. 3A and 3B will be used to describe an operation of the serial-to-parallel functionality of the A/P system 130a of FIG. 2. Step 302 includes receiving a serial bit stream at a first module (e.g., the CDR module 204a). A series of trapezoid-shaped pulse symbols are shown on serial bit stream line 310 of FIG. 3B to represent a series of zero and/or non-zero voltage pulses representing each bit of the serial bit stream. Each pulse symbol is shown with a pulse symbol name (e.g., $b_0$-$b_9$) to distinguish one bit from another. The serial bit stream can be in the form of a number of serial bit signaling formats, including NRZ. Although shown with relative uniformity in pulse duration, the duration of each bit pulse can vary depending on their nominal value due to spread spectrum modulation and/or jitter.

Step 304 includes recovering a serial data stream and a first clocking signal (e.g., serial clocking signal) from the serial bit stream at the first module. First clocking signal timing line 312 of FIG. 3B illustrates a series of bit-wide clocking signal voltage pulse symbols recovered from the first module (e.g., the CDR 204a). Although illustrated using a rising edge trigger scheme, the data and clocking signal streams can be triggered on the falling edge of the serial bit stream and subsequent clocking signal streams. Further, serial data stream timing line 314 illustrates a series of bit-wide, voltage pulse symbols representing the serial data recovered from the serial bit stream. Note that a non-zero delay (that can be further shifted to the right) referenced from the serial bit stream shown on timing line 310 is illustrated.

Step 306 includes receiving the serial data stream and the first clocking signal at a second module (e.g., the SerPar module 210). In step 308, the SerPar module 210 generates a parallel data stream and a second clocking signal, as shown in parallel data stream timing line 316 and second clocking signal timing line 318, respectively. Note that the parallel data stream and second clocking signal include byte-wide voltage pulse symbols. In other words, the parallel data stream shown in parallel data stream timing line 316 has, in this example, a period of 8 bits. The fact that the first pulse symbol of the parallel data stream shown in FIG. 3B includes the byte preceding the serial bits shown in the serial bit stream line 310 is indicative that the parallel data stream is not output from the second module in this example until it has been received. The second clocking signal shown in second clocking signal timing line 318 is represented as having a clocking rate of 1/8th the clocking rate of the first clocking signal.

Figure 4A:
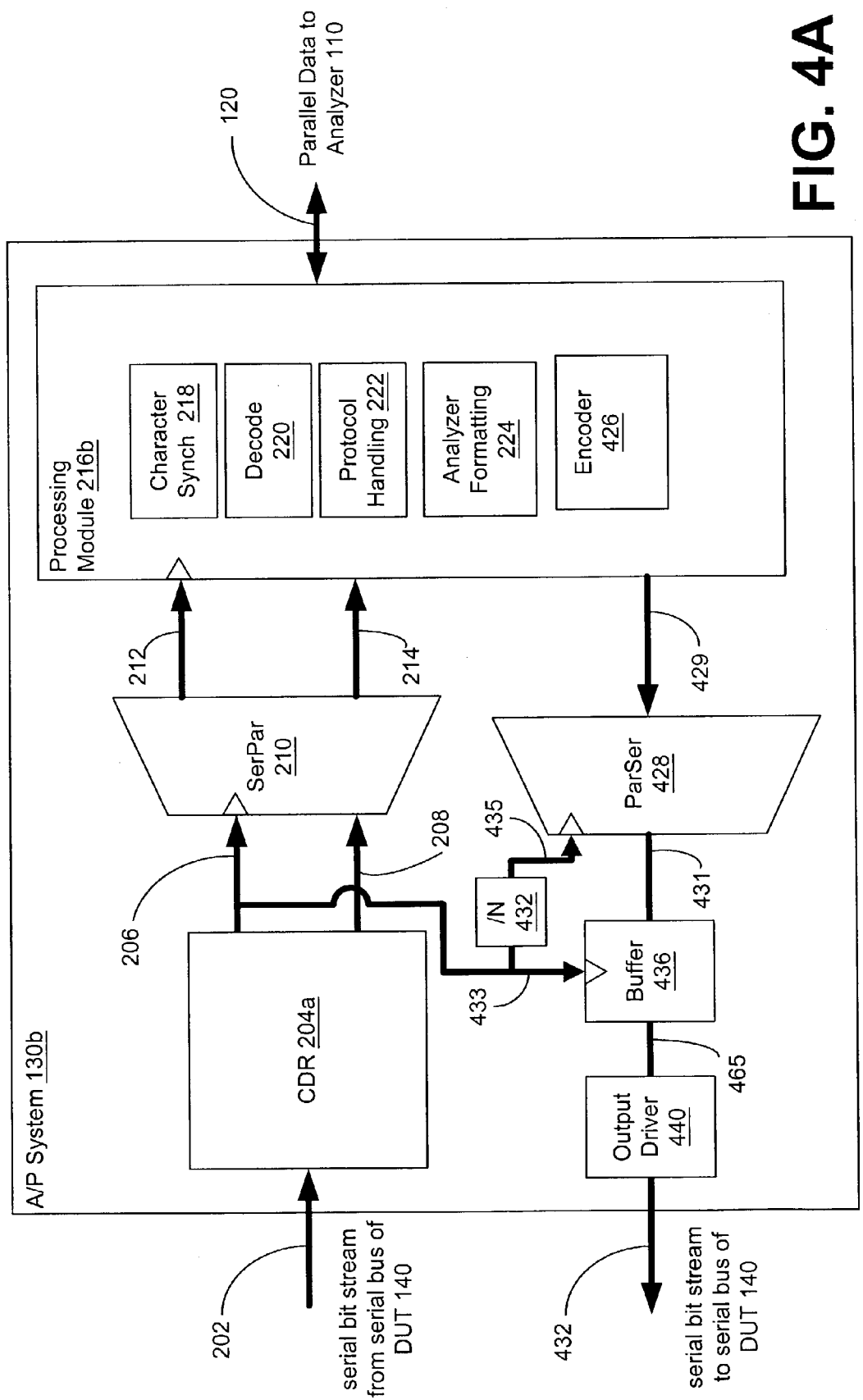
FIG. 4A is a block diagram of another embodiment of an A/P system that includes transmission functionality.

FIG. 4A is a block diagram of another embodiment of an A/P system 130a for a probe that includes transmission functionality. Such an embodiment (i.e., A/P system 130b) is useful for providing an ability to stimulate a DUT. Components for providing stimulation functionality, which are well-known to those having ordinary skill in the art, are omitted for simplicity in discussion. Components 204a and 210, and 218 through 224, are similar to like-numbered components for the embodiment (130a) illustrated in FIG. 2, and thus are omitted to simplify discussion. The A/P system 130b includes transmission functionality in addition to the receiving functionality described in association with the A/P system 130a of FIG. 2. In particular, additional components related to the transmission functionality include a parallel-to-serial (ParSer) module 428, a buffer module 436, an output driver module 440, and a divide by N module 432. Another embodiment for the processing module 216a of FIG. 2 is used, designated as processing module 216b, which further includes encoding functionality via an encoder sub-module 426.

A parallel data stream is received at the processing module 216b from the analyzer 110 (FIG. 1) over connection 120. Although shown over a single connection, different connections can be used. The parallel data stream received at the processing module 216b is then encoded (or scrambled in some embodiments) at encoder sub-module 426. The encoder sub-module 426 provides a mechanism to maintain data transition activity to enable clocking signal recovery. The processing module 216b then provides the encoded data stream over connection 429 to the ParSer module 428. The ParSer module 428 converts the encoded, parallel data stream on connection 429 to a serial data stream, which is provided over connection 431 to the buffer module 436.

To provide for the parallel-to-serial conversion, the ParSer module 428 receives a parallel clocking signal over connection 435 from the divide by N module 432, which receives a serial clocking signal over connection 433. The serial clocking signal provided over connection 433 is derived from the serial clocking signal recovered by the CDR module 204a and provided over connection 206. The divide by N module 432 is configured to provide the desired parallel clocking signal. For example, if the parallel data stream received over connection 120 is 8 bits wide, the derivation of a parallel clocking signal from a serial clocking signal entails a divide by "8" (i.e., N=8) module.

The buffer module 436 receives the serial clocking signal over connection 433 to effectively clock the serial data stream provided from the ParSer module 428 over connection 431. The buffer module 436 provides the buffered serial data stream to the output driver 440 over connection 465. The output driver 440 formats the signal carrying the buffered serial data stream based in part on the physical medium (connection 432) used to carry signals from the A/P system 130b to the DUT 140 (FIG. 1).

FIG. 4B is a block diagram of an embodiment of an A/P system for a probe that uses a different methodology for generating a clocking signal than that described for the embodiment of FIG. 4A. Like components 210, 218 through 224, and 428 through 440, are similar to like-numbered components shown in FIG. 4A, except as described below. Additional components for providing transmission and/or other processing functionality include an external time base module (e.g., a crystal oscillator) 450, a transmit clock generator 442, and a buffer sub-module 427. The CDR module 204b is another embodiment of the CDR module 204a shown in FIG. 2, and further includes the transmit clock generator 442. Note that in other embodiments, a transmit clock generator can be located in other modules. The processing module 216c is another embodiment of the processing module 216b shown in FIG. 4A, and includes the buffer sub-module 427 in addition to the elements included in the processing module 216b. The transmit clock generator 442 receives an oscillatory signal from the external time base module 450 over connection 454. The oscillatory signal is at a defined frequency. The transmit clock generator 442 multiplies the oscillatory signal to derive the serial clocking signal carried over connection 446. The transmit clock generator 442 thus provides a serial clocking signal to the buffer module 436 over connection 446.

The transmit clock generator 442 also generates a parallel clocking signal based on the oscillatory signal provided by the external time base module 450 in similar fashion to that described above for the serial clocking signal. This parallel clocking signal is provided to the SerPar module 428 and to the buffer sub-module 427 over connection 444. In other embodiments, this parallel clocking signal can be derived from a divide by N module, which can receive a serial clocking signal from the transmit clock generator 442 and responsively derive a parallel clocking signal in a manner similar to that shown in FIG. 4A.

The buffer sub-module 427 also receives a parallel clocking signal provided over connection 448, which is derived from the SerPar module 210 and provided over connection 212. The buffer sub-module 427 resolves transient or static frequency differences that occur between the two parallel clocking signals occurring over connections 448 and 444. In other words, differences between the two time bases (i.e., the parallel clocking signal recovered from the clocking signals of the received bit stream and the generated clocking signals from the transmit clock generator 442) are resolved by the buffer sub-module 427. For transient frequency differences, the buffer sub-module 427 acts in a throttling manner to variably delay the output of the processing module 216c over connection 429. For static (e.g., direct current (DC) offset) frequency differences between the two parallel clocking signals, an under-flow or overflow condition can arise. Typically, the implemented protocol has a provision for enabling the processing module 216c to either skip or insert characters or symbols.

In operation, the ParSer module 428 receives an encoded, parallel data stream from the processing module 216c over connection 429, and it also receives the parallel clocking signal over connection 444 from the transmit clock generator 442. The ParSer module 428 converts the received parallel data stream to a serial data stream, and provides the serial data stream to the buffer module 436 over connection 431. The buffer module 436 can be a first-in-first-out (FIFO) buffer. The buffer module 436, which functions as described in association with FIG. 4A, is clocked with a serial clocking signal received from the transmit clock generator 442 over connection 446. The buffer module 436 absorbs short-term deviations in data rates between the incoming data over connection 431 and the outgoing data over connection 465. The buffer 436 provides a buffered serial data stream over connection 465 to the output driver 440, which formats the serial data stream for delivery to the DUT 140 (FIG. 1) over connection 432.

Thus, some or all of the benefits of modularizing components as described for the A/P system 130a can also be attained for A/P systems 130b (FIG. 4A) and 130c (FIG. 4B).

It should be emphasized that the above-described embodiments are merely possible examples of implementations. Many variations and modifications may be made to the above-described embodiment(s). All such modifications and variations are intended to be included herein within the scope of this disclosure and protected by the following claims.

Therefore, at least the following is claimed:

1. A modular, jitter-tolerant, data acquisition and processing system, comprising:
a receiving portion having:
a first module configured to receive a serial bit stream and recover a serial data stream and a first clocking signal from the serial bit stream;
a second module configured to receive the serial data stream and the first clocking signal and generate a parallel data stream and a second clocking signal;
a third module configured to receive the parallel data stream and the second clocking signal, wherein the third module comprises a character synchronization sub-module, a decoding sub-module, a protocol handling sub-module, and a formatting sub-module; and
a transmitting portion having:
the third module further configured to receive a second parallel data stream from an analyzer, wherein the third module is further configured with an encoder sub-module to encode the received second parallel data stream;
a divide by N module to derive a third clocking signal from the first clocking signal; and
a fourth module configured to convert the encoded parallel data stream to a second serial data stream.

2. The system of claim 1, further comprising an analyzer that receives a processed parallel data stream from the third module.

3. The system of claim 1, wherein the third module comprises at least one of a field programmable gate array and an application specific integrated circuit.

4. The system of claim 1, wherein the first module, the second module, and the third module are modular components, wherein the modular components comprise at least one of physically separate components and physically separate monolithic devices.

5. The system of claim 1, wherein the fourth module is configured to receive the third clocking signal, wherein the third clocking signal is a parallel clocking signal.

6. The system of claim 1, wherein the transmitting portion further comprises a buffer module that receives the second serial data stream from the fourth module and buffers the second serial data stream, wherein the buffer receives the first clocking signal front the first module, wherein the transmitting portion further comprises an output driver that receives the buffered second serial data stream and provides an output signal comprising the buffered serial data stream to a device under test.

7. The system of claim 1,
the third module being further configured with a buffer sub-module to buffer the received second parallel data stream; and
the fourth module being configured to convert the buffered and encoded parallel data stream to the second serial data stream.

8. The system of claim 7, wherein the transmitting portion further comprises an external time base module to generate a reference signal, wherein the transmitting portion further comprises the first module further configured with a transmit clock generator, wherein the transmit clock generator is connected to the external time base module, wherein the transmit clock generator generates a fourth clocking signal and a fifth clocking signal.

9. The system of claim 8, wherein the fourth clocking signal is a parallel clocking signal and the fifth clocking signal is a serial clocking signal.

10. The system of claim 8, wherein the third module and the
fourth module are configured to receive the fourth clocking signal, wherein the fourth clocking signal is a parallel clocking signal.

11. The system of claim 8, wherein the transmitting portion further comprises a divide by N module that generates a sixth clocking signal from the fifth clocking signal, wherein the third module and the fourth module are configured to receive the sixth clocking signal, wherein the sixth clocking signal is a parallel clocking signal.

12. The system of claim 8, wherein the transmitting portion further comprises a buffer module that receives the second serial data stream from the fourth module and buffers the second serial data stream, wherein the buffer receives the fifth clocking signal from the first module, wherein the transmitting portion further comprises an output driver that receives the buffered second serial data stream and provides an output signal comprising the buffered serial data stream to a device under test.

13. The system of claim 1, wherein the first module comprises a clock and data recovery (CDR) module.

14. The system of claim 1, wherein the second module comprises a serial to parallel module.

15. The system of claim 1, wherein the first module and the second module are modular components, wherein the modular components comprise at least one of physically separate components and physically separate monolithic devices.

16. The system of claim 1, wherein the first clocking signal comprises a serial clocking signal and the second clocking signal comprises a parallel clocking signal.

17. A method for processing data in a modular, jitter-tolerant data acquisition and processing system, said method comprising:
receiving a serial bit stream at a first module;
recovering a serial data stream and a first clocking signal from the serial bit stream at the first module;
receiving the serial data stream and the first clocking signal at a second module;
generating a parallel data stream and a second clocking signal at the second module;
receiving the parallel data stream and the second clocking signal and performing character synchronization, decoding, protocol handling, and formatting at a third module;
receiving at the third module a second parallel data stream from an analyzer;
encoding the received second parallel data stream at the third module;
converting the encoded second parallel data stream to a second serial data stream at a fourth module; and
receiving at the fourth module a third clocking signal from a divide by N module, wherein the divide by N module converts the first clocking signal to the third clocking signal, wherein the third clocking signal is a parallel clocking signal.

18. The method of claim 17, further comprising
receiving at an analyzer a signal that comprises a processed parallel data stream generated at the third module.

19. The method of claim 17, wherein the first module, the second module, and the third module are modular components, wherein the modular components comprise at least one of physically separate components and physically separate monolithic devices.

20. The method of claim 17, further comprising:
receiving at a buffer module the second serial data stream;
receiving at the buffer module the first clocking signal;
buffering the received second serial data stream at the buffer module; receiving the buffered second serial data stream at an output driver; and
providing an output signal comprising the buffered serial data stream to a device under test.

21. The method of claim 17, further comprising:
receiving at the third module a second parallel data stream from an analyzer;
encoding the received second parallel data stream at the third module; and
buffering the encoded second parallel data stream at the third module.

22. The method of claim 21, further comprising:
generating a reference signal at a external time base module;
receiving the reference signal at a transmit clock generator disposed in the first module; and
converting the reference signal to a fourth clocking signal and a fifth clocking signal, wherein the fourth clocking signal is a parallel clocking signal and the fifth clocking signal is a serial clocking signal.

23. The method of claim 22, further comprising receiving the fourth clocking signal at the fourth module and the fifth module.

24. The method of claim 22, further comprising:
converting the fifth clocking signal to a sixth clocking signal at a divide by N module, wherein the sixth clocking signal is a parallel clocking signal; and receiving the sixth clocking signal at the fourth module and the fifth module.

25. The method of claim 22, further comprising:
receiving the second serial data stream at the buffer module from the fourth module;
buffering the second serial data stream at the buffer module;
receiving the fifth clocking signal at the buffer module from the first module;
receiving the buffered second serial data stream at an output driver; and
providing an output signal comprising the buffered serial data stream to a device under test.

* * * * *

UNITED STATES PATENT AND TRADEMARK OFFICE
CERTIFICATE OF CORRECTION

PATENT NO. : 7,339,982 B2  Page 1 of 1
APPLICATION NO. : 10/437320
DATED : March 4, 2008
INVENTOR(S) : Wood, Jr.

It is certified that error appears in the above-identified patent and that said Letters Patent is hereby corrected as shown below:

In column 8, line 63, in Claim 6, delete "front" and insert -- from --, therefor.

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

PATENT NO.        : 7,339,982 B2
APPLICATION NO.   : 10/437320
DATED             : March 4, 2008
INVENTOR(S)       : Wood, Jr.

It is certified that error appears in the above-identified patent and that said Letters Patent is hereby corrected as shown below:

In column 8, line 63, in Claim 6, delete "front" and insert -- from --, therefor.

Signed and Sealed this

Twelfth Day of August, 2008

JON W. DUDAS
*Director of the United States Patent and Trademark Office*